United States Patent Office 3,729,467
Patented Apr. 24, 1973

3,729,467
PROCESS FOR THE PRODUCTION OF
BIS-ARENAZOLYL METHINES
Reinhard Zweidler, 12 Kienbergstrasse, and Ivan Orban,
 10 In den Klostermatten, both of Basel, Switzerland
No Drawing. Continuation-in-part of application Ser. No.
 696,722, Jan. 10, 1968. This application May 25, 1970,
 Ser. No. 40,435
Int. Cl. C09b 23/04
U.S. Cl. 260—240.7        6 Claims

ABSTRACT OF THE DISCLOSURE

A novel process for the production of certain basic bis-arenazolyl-methines, useful as optical brighteners or bactericidal substances by alkylation of certain bis-arenazolyl-methylenes which are produced in turn from a reactive function al derivative of malonic acid and o-aminophenols is disclosed, which process avoids the necessity of using carbondisulphide as starting material, and of disposing the toxic methyl mercaptan obtained as by-product, in the hitherto used industrial process for the production of such compounds.

RELATED APPLICATION

The present application is a continuation-in-part of copending application Ser. No. 696,722, filed Jan. 10, 1968 and now abandone.

The invention concerns a new, advantageous process for the production of bis-arenazolyl-methane compounds.

It is known that basic bis(N-alkyl-benzoxazolyl-(2))-methine compounds, the so-called oxacyanines, are valuable optical brighteners for synthetic fibres based on polyacrylonitrile.

The technical process usual hitherto for the production of these optical brighteners consists of three steps:

(a) condensation of an o-aminophenol or o-aminonaphthol with carbon disulphide in the presence of an alkylating agent to form the corresponding 2-alkyl-mercapto-benzoxazole or -naphthoxazole;

(b) condensation of an identical or different o-aminophenol or o-aminonaphthol with acetic acid or a reactive functional derivative of acetic acid to form the corresponding 2-methyl-benzoxazole or -naphthoxazole;

(c) condensation of the 2-alkylmercapto-arenazole obtained according to (a) with the 2-methyl-arenazole obtained according to (b) in the presence of a further equivalent of alkylating agent while splitting off methyl mercaptan to form the desired oxacyanine.

The essential disadvantages of this process are the use of toxic, malodorous and extremely easily inflammable carbon disulphide and the formation of malodorous, easily volatile and also very toxic methyl mercaptan which can only be removed from the end product and the waste substances at great expense by the use of large apparatus.

It has now been found that these disadvantages can be unexpectedly avoided and the desired end products of general Formula I

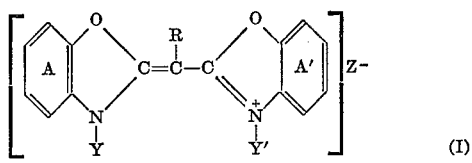

wherein each of benzene nucleus A and A' is unsubstituted or substituted by alkyl having 1 or 2 carbon atoms or alkoxy having 1 or 2 carbon atoms, each of Y and Y' represents a methyl or ethyl group, R represents hydrogen or an alkyl group having 1 to 4 carbon atoms or a phenyl group, and Z⁻ represents a colourless anion of an inorganic or organic acid of hexavalent sulfur, can be produced in very good yield and great purity when a bis-arenazolyl-methyl compound of general Formula II

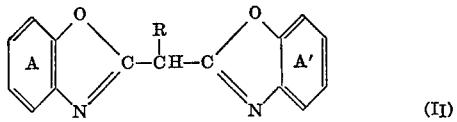

wherein R has the same meaning as in Formula I, and A and A' are unsubstituted or substituted as in Formula I, is alkylated in an aromatic solvent at a temperature of from 100 to 120° C. with about one equivalent weight of a lower alkanol ester of sulfuric acid or aryl sulfonic acid having one or two carbon atoms in the alkanol groups as alkylating agent, reacting the resulting intermediate in aquous medium at a pH of from 6 to 10 with about one equivalent of alkali metal hydroxide, carbonate or bicarbonate, quaternization of the resulting tertiary amine compound with about one equivalent of a lower alkanol ester of sulfuric acid or aryl sulfonic acid having one or two carbon atoms in the alkanol groups as alkylating agent in an organic solvent at a temperature of from 100 to 120° C., and recovering the resulting compound falling under Formula I from the reaction mixture.

R in the Formula I represents preferably hydrogen.

The compounds of Formula II can be produced by reacting one equivalent of a compound of Formula III and one equivalent of a compound of Formula IV

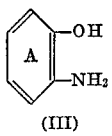        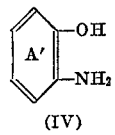

(III)                    (IV)

wherein the symbols A and A' have the meanings given in Formula I, with an equivalent of a reactive function deriative of malonic acid which can optionally be substituted in meso-position by an alkyl group having 1 to 4 carbon atoms or a phenyl group.

Suitable starting materials of Formulae III and IV for the production of the compounds of Formula II are o-aminophenols which can be contain methyl or ethyl groups, preferably methyl in p-position to the hydroxyl group, or methoxy or ethoxy groups. Preferably the methyl or ethyl ester is used as reactive functional derivative of malonic acid, whereby R is primarily hydrogen.

The condensation of the starting materials for the production of the intermediates of Formula II is advantageously performed in an inert solvent at temperatures between 140 and 150° C. Suitable solvents are, particularly, xylene, dichlorobenzene or high boiling benzines. Ring closure is advantageously accelerated by acid catalysts and the water formed is distilled off azeotropically.

Bis-benzoxazolyl-methylene compounds of Formula II in which A and A' are the same and R is hydrogen are the preferred starting materials. The compounds of general Formula II are reacted in an inert solvent at raised temperature with an equivalent weight of a lower alkanol ester of sulfuric acid or aryl sulphonic acid having 1 or 2 carbon atoms in the alkanol groups as alkylating agent to form an intermediate product of Formula V

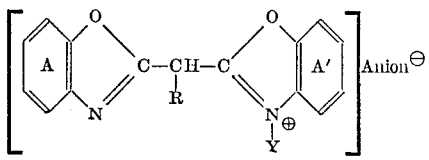

Lower alkanol esters of sulphuric acid or aryl sulphonic acids are such as dimethyl sulphate, diethyl sulphate, p-toluene sulphonic acid methyl or ethyl ester, p-chlorobenzene sulphonic acid methyl ester and benzene sulphonic acid methyl ester. The alkylation is performed in inert aromatic solvents such as chlorobenzene, toluene or xylene, at a temperature of from 100–120° C.

The quaternized compound of Formula V thus formed is then reacted with an equivalent of alkali metal hydroxide, alkali metal carbonate or alkali metal bicarbonate, in aqueous medium at a pH of 6–10 and especially 8–10, to form a compound of Formula VI

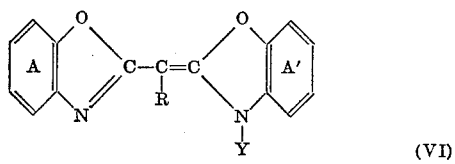

wherein A, A', R and Y have the meanings given above. This intermediate product of Formula VI is again reacted with an equivalent of one of the alkylating agents mentioned above, preferably with dimethyl sulphate, diethyl sulphate or p-toluene sulphonic acid methyl or ethyl ester, to form the desired end product of Formula I. Preferably the same alkylating agent is used for both alkylations.

The end products produced by the process described above are, if R means hydrogen, valuable optical brighteners for cellulose; together with the cation active auxiliaries which improve the feel of the material, they are particularly suitable for use in rinsing baths for polymeric and copolymeric acrylonitrile fibres. They can also be used as additives to the spinning melts in the production of synthetic fibres. On esterified cellulose and synthetic polyamide they also produce a pleasant optical whitening.

The end products are also bactericidal substances; they show especially good effects against gram positive bacterias like staphylococci and streptococci.

The following examples illustrate the invention. The temperatures are given therein in degrees centigrade.

EXAMPLE 1

40.4 g. of 1-(5-methyl-benzoxazol-2-yl)-1-(3,5-dimethyl-benzoxazol-2-yl)-methylene methosulphate, in the most finely pulverised form possible, are added at room temperature to 500 ml. of water while stirring well. The acid suspension which reacts blue to Congo red paper is then adjusted to pH 9.7–10.2 by the dropwise addition of concentrated sodium hydroxide solution and is stirred for another 5 hours at room temperature. The pH is kept at 9.7–10.2 by further addition of sodium hydroxide solution, the total amount of sodium hydroxide needed being about 4.4–5.2 g. The suspension is filtered, the residue is well washed with cold water and dried in vacuo at 92–95° under 13 torr. In this way a beige-yellow crude product is obtained. It melts at 183–207° and the yield is 92–97% of the theoretical. On recrystallising from boiling chlorobenzene, 1-(5-methyl-benzoxazol-2-yl)-1-(3,5-dimethyl-benzoxazolin-2-ylene)-methine is obtained in a state sufficiently pure for analysis. It melts at 190–192° (uncorrected). 29 g. of the methine mentioned above are then dissolved in 500 ml. of dry, warm chlorobenzene. 20 g. of p-toluene sulphonic acid methyl ester are added dropwise to the solution at 80–85° while stirring, afterwards the temperature is raised to 110–120° and the mixture is stirred for 4 hours at this temperature. After cooling, the precipitated product is filtered off, washed with a small amount of chlorobenzene and dried in vacuo at a temperature of 110–115°. Bis-(3,5-dimethyl-benzoxazol-2-yl)-monomethine cyanine-p-toluene sulphonate (3,3',5,5'-tetramethyl-oxacyanine-p-toluene sulphonate) is obtained as a pale yellowish powder which melts at 246–247° with decomposition. The yield is 70–75% of the theoretical.

The compound is a valuable agent for the optical brightening of synthetic polyamide fibres, esterified cellulose fibres and polymeric or copolymeric acrylonitrile fibres in aqueous baths. In addition it can be used as optical brightener before or during the spinning of polymeric or copolymeric acrylonitrile.

Products having a similar action are obtained if, instead of 20 g. of p-toluene sulphonic acid methyl ester in the above example, 19 g. of benzene sulphonic acid methyl ester, or 23 g. of p-chlorobenzene sulphonic acid methyl ester, or 14 g. of dimethyl sulphate and otherwise the same procedure is followed. Bis-(3,5-dimethyl-benzoxazol-2-yl)-monomethine cyanine - benzene sulphonate (M.P. 252–254° with decomposition), or -p-chlorobenzene sulphonate (M.P. 246–248° with decomposition), or -methosulphate (M.P. 298–300° with decomposition), are obtained as pale yellowish powders. In addition, in the above example, the p-toluene sulphonic acid methyl ester can be replaced by 22 g. of p-toluene sulphonic acid ethyl ester of by 17 g. of diethyl sulphate. With the same procedure, 1 - (3-ethyl-5-methyl-benzoxazol-2-yl)-1-(3,5-dimethyl - benzoxazol-2-yl)-monomethine cyanine-p-toluene sulphate (M.P. 244–246° with decomposition), or -ethoxy sulphate (M.P. 273–276° with decomposition), are obtained as pale yellowish powders.

The 1-(5-methyl-benzoxazol - 2 - yl)-1-(3,5-dimethyl-benzoxazol-2-yl)-methylene methosulphate used in the above example is produced in the following way:

(a) 24.3 g. of 1-amino-2-hydroxy-5-methyl benzene, 16.1 g. of malonic acid diethyl ester and 12.5 g. of p-xylene are gently boiled in a distillation apparatus at an inner temperature of about 140–150° in such a way that the distillation temperature at the head of the column does not exceed 80–85°. Ethanol is distilled off. Because of the precipitation of bis-hydroxyphenylamide of malonic acid, towards the end of the splitting off of alcohol, the contents of the flask become solid. To accelerate splitting off of water, which has now begun with formation of bis-oxazole, 0.1 g. of p-toluene sulphonic acid are added to the reaction mixture and the inner temperature is simultaneously raised to 170–180° while p-xylene is distilled off. After this temperature has been reached, the water which has been split off is removed in a water separator by azeotropic distillation. To complete the splitting off of water, the temperature is raised to 190–200° towards the end of the reaction and then the reaction mixture is distilled in a sloping condenser. First the p-xylene is distilled off under normal pressure, it is then completely removed under vacuum and the reaction product is then fractionated at a temperature of 226–228° under 2 torr. In this way, bis-(5-methyl-benzoxazol-2-yl)-methylene is obtained as a white-yellowish crystal mass which melts at 83–85° (uncorrected). The yield is about 85% of the theoretical.

(b) 27.9 g. of bis-(5-methyl-benzoxazol-2-yl)-methylene are dissolved in 60 g. of dry warm chlorobenzene, 15 g. of dimethyl sulphate are then dropped into the solution at a temperature of 110–112° and then the whole is stirred for 6 hours at a temperature of 112–115°. After cooling, the precipitated reaction product is filtered off, washed with a slight amount of chlorobenzene and dried in vacuo at 110–115°. In this way, 1-(5-methyl-benzoxazol-2-yl)-1-(3,5-dimethyl-benzoxazol - 2 - yl)-methylene methosulphate is obtained as a beige powder which melts at 219–220° with decomposition. The yield is about 90% of the theoretical.

EXAMPLE 2

43.6 g. of 1-(5-methoxy-benzoxazol-2-yl)-1-(3-methyl-5-methoxy-benzoxazol-2-yl)-methylene methosulphate are added to 400 ml. of water and the whole is stirred for half an hour at room temperature and then, at the same temperature, 16.8 g. of sodium bicarbonate are added within 1 hour. The mixture is stirred for another half hour, 320 g. of chlorobenzene are added, the temperature is raised to 85° and the whole is stirred for 15 minutes at this temperature whereupon the lower chlorobenzene phase is separated. The aqueous phase is extracted again with 120 g. of chlorobenzene at a temperature of 85°. The combined chlorobenzene solutions, in a distillation apparatus with a sloping condenser, are then heated until a distillation temperature of 130–132° has been attained and the water has been completely removed. The reaction mixture is then kept for 1 hour under vigorous reflux at a temperature of 130–132°. The 1-(5-methoxy-benzoxazol-2-yl)-1-(2-hydroxy-3-methyl-5-methoxy-benzoxazolin-2-yl)-methylene is completely converted into 1-(5-methoxy-benzoxazol-2-yl)-1-(3-methyl-5-methoxy-benzoxazolin-2-ylene)-methine. On completion of this reaction, 20.5 g. of p-toluene sulphonic acid methyl ester are added dropwise within 30 minutes at a temperature of 128–130°. The reaction product begins to crystallise out after a short time in the form of yellow-green needles. To complete the reaction, the mixture is stirred for another 3 hours under weak reflux. The suspension is then cooled to room temperature, the precipitate is filtered off, washed with 80 g. of isopropyl alcohol and dried in vacuo at 70–80°. Bis-(3-methyl-5-methoxy-benzoxazol-2-yl)-monomethine-cyanine-p-toluene sulphonate (3,3'-dimethyl-5,5'-dimethoxy-oxacyanine-p-toluene sulphonate) is obtained as greenish-yellow needles which melt at 289–291° with decomposition. The yield is 85% of the theoretical.

The compound is a value agent for the optical brightening of cellulose fibres, e.g. in rinsing baths which contain action active textile auxiliaries which improve the feel of the textile material. In addition, the compound is suitable for the optical brightening of polymeric and copolymeric acrylonitrile, for which purpose it is either added to the spinning mass before spinning or the finished fibres are treated therewith in an aqueous, acid bath. Also, the compound can be used for the optical brightening of esterified cellulose or synthetic polyamide fibre material. Products having a similar action are obtained if in the above example with otherwise the same procedure, instead of 20 g. of p-toluene sulphonic acid methyl ester, 19 g. of benzene sulphonic acid methyl ester or 23 g. of p-chlorobenzene sulphonic acid methyl ester of 14 g. of dimethyl sulphate are used. Bis-(3-methyl-5-methoxy-benzoxazol-2-yl)-monomethine-cyanine - benzene sulphonate, M.P. 299–300° with decomposition, or -p-chlorobenzene sulphonate, M.P. 288–289° with decomposition, or -methosulphate, M.P. 302–305° with decomposition are obtained as yellowish powders. Also in the above example, the p-toluene sulphonic acid methyl ester can be replaced by 22 g. of p-toluene sulphonic acid ethyl ether or by 17 g. of diethyl sulphate and, with otherwise the same procedure, 1-(3-ethyl-5-methoxy-benzoxazol-2-yl)-1-(3-methyl-5-methoxy-benzoxazol-2-yl)-monomethine-cyanine -p-toluene sulphonate, M.P. 267–268° with decomposition, or -ethoxy sulphate, M.P. 283–286° with decomposition, are obtained as yellowish powders.

The 1-(5-methoxy-benzoxazol-2-yl)-1-(3-methoxy-benzoxazol-2-yl)-methylene methosulphate used in the above example is produce as follows:

(a) 27.8 g. of o-amino-2-hydroxy-5-methoxybenzene, 16.2 g. of malonic acid diethyl ester in 75 g. of 1,2-dichlorobenzene are stirred under an atmosphere of nitrogen for 7 hours at 149–152°. A mixture of ethanol and 1,2-dichlorobenzene distill off from the reaction mixture and the reaction product separates as a thick crystal slurry. On completion of the reaction, the temperature is reduced to 70°, 22 g. of methylethyl ketone are added and then the temperature is further reduced to 20°. The crystals are filtered off and washed with several portions of methylethyl ketone amounting, in all, to another 40 g. The crude product is then slurried in 65 ml. of water and traces of methylethyl ketone are removed with steam. Another 60 ml. of water are added, the whole is filtered, the precipitate is washed with water and dried in vacuo at 89–90°. In this way, methylene-1,1-dicarboxylic acid-(2-hydroxy-5-methoxy anilide) is obtained as a beige powder which melts at 230–231° with decomposition. The yield is 78–85% of the theoretical.

34.6 g. of methylene-1,1-dicarboxylic acid-(2-hydroxy-5-methoxy anilide) and 1 g. of p-toluene sulphonic acid in 126 g. of 1,2-dichlorobenzene are heated to 170° under an atmosphere of nitrogen. The reaction mixture is kept for 3 hours at a temperature of 168–172° whereby the reaction water and a small amount of 1,2-dichlorobenzene distill off. The reaction mixture is then quickly cooled to 75°, 45 g. of isopropanol are added, the temperature is reduced to 20°, the precipitate is filtered off and washed with another 40 g. of isopropanol. After drying in vacuo, bis-(5-methoxy-benzoxazol-2-yl)-methylene is obtained at 70–80° as a beige powder which melts at 162–164° (Kofler heating bench). The yield is 70–80% of the theoretical.

(b) 31.1 g. of bis-(5-methoxy-benzoxazol-2-yl)-methylene are dissolved in 60 g. of warm chlorobenzene and quaternised at a temperature of 80–110° by the addition dropwise of 15 g. of dimethyl sulphate. On completion of the reaction, it is cooled, filtered off, washed with a small amount of chlorobenzene and dried in vacuo at 90–95°. 1-(5-methoxy-benzoxazol-2-yl)-1-(3-methyl-5-methoxy-benzoxazol-2-yl)-methylene methosulphate is obtained as a beige powder. It melts at 267–269° with decomposition and the yield is 92–95% of the theoretical.

EXAMPLE 3

43.3 g. of 1-(5,6-dimethyl-benzoxazol-2-yl)-1-(3,5,6-trimethyl-benzoxazol-2-yl)-methylene methosulphate in an aqueous suspension are converted as described in Example 1 by the addition of an aqueous solution of sodium hydroxide at a pH of 9.7 to 10.2 into 1-(5,6-dimethyl-benzoxazol-2-yl)-1-(3,5,6-trimethyl-benzoxazolin-2-ylene)-methine. 32.0 g. of this methine in 550 ml. of chlorobenzene are then quaternised as described in Example 1 at 110–120° with 20 g. of p-toluene sulphonic acid methyl ester. The precipitated product is filtered off, washed with chlorobenzene and dried in vacuo. Bis-3,5,6-trimethyl-benzoxazol-2-yl)-monomethine-cyanine-p-toluene sulphonate (3,3',5,5',6,6'-hexamethyl-oxacyanine-p-toluene sulphonate) is obtained as a yellowish powder which melts at 311–314° with decomposition.

The compound is an excellent agent for the optical brightening of cellulose fibres in rinsing baths in the presence of cation active textile auxiliaries. The compound can also be used for the optical brightening of synthetic polyamide fibres in neutral to weakly alkaline baths or for the brightening of polyacrylonitrile fibres in acid baths.

If in the above example, the 1-(5,6-dimethyl-benzoxazol-2-yl)-1-(3,5,6-trimethylbenzoxazol-2-yl)-methylene methosulphate is replaced by 43.3 g. of 1-(5,7-dimethyl-benzoxazol-2-yl)-1-(3,5,7-trimethyl-benzoxazol-2-yl)-methylene methosulphate and otherwise the same method is followed, then bis-(3,5,7-trimethyl-benzoxazol-2-yl)-monomethine cyanine-p-toluene sulphonate is obtained by way of 1-(5,7-dimethyl-benzoxazol-2-yl)-1-(3,5,7-trimethyl-benzoxazolin-2-ylene)-methine. It is a yellowish powder which melts at 308–311° with decomposition. This compound is an agent having a similar brightening action as the compound mentioned above. A more reddish product but having weaker fluorescence is obtained if in the above example, the 1-(5,6-dimethyl-benzoxazol-2-yl)-1-(3,5,6-trimethyl-benzoxazol-2-yl)-methylene methosulphate is replaced by 37.6 g. of 1-

(benzoxazol - 2 - yl)-1-(3-methyl-benzoxazol-2-yl)-methylene methosulphate or by 44.5 g. of 1 - (5 - chlorobenzoxazol-2-yl)-1-(3 - methyl - 5 - chlorobenoxazole-2-yl)-methylene methosulphate and otherwise the procedure described above is followed. Bis-(3-methyl-benzoxazol-2-yl)- or bis-(3-methyl-5-chlorobenzoxazol - 2 - yl)-monomethine cyanine-p-toluene sulphonate is obtained as pale yellowish powder. The former melts at 296–299° with decomposition and the latter at 247–250° will decomposition.

The derivatives of 1-(benzoxazol-2-yl)-1-(3-methylbenzoxazol-2-yl)-methylene methosulphate used in the above example are produced as follows:

27.3 g. of 1-amino-2-hydroxy-4,5-dimethylbenzene, or 27.3 g. of 1-amino-2-hydroxy-3,5-dimethyl-benzene or 21.8 g. of 1-amino-2-hydroxybenzene, or 28.7 g. of 1-amino - 2 - hydroxy - 5 - chlorobenzene, and 16.2 g. of malonic acid diethyl ester are condensed while splitting off alcohol to form bis-o-hydroxyphenylamide, then condensed by heating under the conditions described in the previous examples in the presence of 1 g. of p-toluene sulphonic acid while splitting off water to form bis-(5,6-dimethyl- or bis-(5,7-dimethyl-benzoxazol-2-yl)-methylene or bis-(benzoxazol-2-yl)- or bis-(5-chlorobenzoxazol-2-yl)-methylene. On quaternising this with dimethylsulphate in chlorobenzene, 1-(5,6-dimethyl-benzoxazol-2-yl)-1 - (3,5,6 - trimethyl-benzoxazol-2-yl)-methylene methosulphate (M.P. 247–249° with decomposition) or 1-(5,7-dimethyl - benzoxazol - 2 - yl) - 1 - (3,5,7 - trimethyl-benzoxazol-2-yl)-methylene methosulphate (M.P. 253–255° with decomposition), or 1 - benzoxazol-2-yl)-1-(3-methyl-benzoxazol-2-yl)-methylene methosulphate, M.P. 184–188° with decomposition, or 1-(5-chlorobenzoxazol-2 - yl) - 1-(3-methyl-5-chlorobenzoxazol-2-yl)-methylene methosulphate, M.P. 202–204° with decomposition, are obtained as whitish, yellowish powders.

EXAMPLE 4

41.8 g. of 1-methyl-1-(5-methyl-benzoxazol-2-yl)-1-(3,5 - dimethyl - benzoxazol - 2 - yl)-methylene methosulphate are reacted under the conditions described in Example 2, in aqueous suspension, with sodium bicarbonate. The reaction product is taken up in 1,2-dichlorobenzene, water is azeotropically removed from the solution while heating. 20.5 g. of p-toluene sulphonic acid methyl ester are then added at 120–128° to the dichlorobenzene solution of the 1-(methyl)-1-(5-methyl-benzoxazol-2-yl)-1-(3,5-dimethyl-benzoxazolin - 2 - ylene)-methine formed and the whole is gently refluxed for 4 hours while stirring. After cooling to room temperature, the reaction product is filtered off, washed and dried in vacuo.

1 - methyl - bis - 1,1 - (3,5 - dimethyl-benzoxazol-2-yl)-monomethine cyanine-p-toluene sulphonate is obtained as a yellowish white powder which melts at 205–208° with decomposition and shows antibacterial effects especially against gram positive bacterias like staphylococci and streptococci.

If in the above example, the 1-methyl-1-(5-methyl-benzoxazol - 2 - yl) - 1 - (3,5-dimethyl-benzoxazol-2-yl) methylene methosulphate is replaced by 46.1 g. of 1-butyl-1 - (5 - methyl - benzoxazol - 2 - yl) - 3,5-dimethyl-benzoxazol-2-yl)-methylene methosulphate, or by 48.2 g. of 1 - phenyl - 1 - (5 - methyl-benzoxazol - 2 - yl)-1-(3,5-dimethyl - benzoxazol - 2 - yl) - methylene methosulphate and otherwise the same procedure is followed, then 1-butyl- or 1-phenyl-bis,1,1-(3,5-dimethyl-benzoxazol-2-yl)-monomethine cyanine-p-toluene sulphonate is obtained as pale yellowish powder.

The 1-methyl-, or 1-butyl-, or 1-phenyl- 1-(5-methyl-benzoxazol - 2 - yl) - 1 - (3,5 - dimethyl-benzoxazol-2-yl)-methylene methosulphate used in the above example is obtained as follows: 24.6 g. of 1-amino-2-oxy-5-methylbenzene are reacted as described in Example 2 with 17.4 g. of methyl malonic acid diethyl ester or with 21.6 g. of butyl malonic acid diethyl ester or with 23.6 g. of phenyl malonic acid diethyl ester, while splitting off alcohol, to form the bis-amide, the temperatures to form the amide being raised if necessary. The bis-amide is then converted, while splitting off water, into 1-methyl-, 1-butyl- or 1 - phenyl - bis-(5-methyl-benzoxazol-2-yl)-methylene and then quaternised with dimethyl sulphate. 1-methyl-, 1-butyl-, or 1-phenyl-1-(5-methyl-benzoxazol-2-yl)-1-(3, 5 - dimethyl -benzoxazol - 2 - yl) - methylene methosulphate is obtained as whitish powder. The first compound melts at 211–213° with decomposition, the second at 182–185° with decomposition, the third at 228–229° with decomposition.

What we claim is:

1. A process for the production of a compound of the Formula I

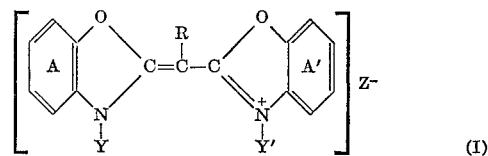

(I)

wherein each of benzene nucleus A and A' is unsubstituted or substituted by alkyl having 1 or 2 carbon atoms or alkoxy having 1 or 2 carbon atoms, each of Y and Y' represents a methyl or ethyl group, R represents hydrogen or an alkyl group having 1 to 4 carbon atoms or a phenyl group, and Z⁻ represents a lower alkyl sulfate or aryl sulfonate colorless anion, which process comprises (a) a monoalkylating process in an inert aromatic solvent at a temperature of from 100 to 120° C. of a bis-arenoaxolyl methylene compound of the Formula II

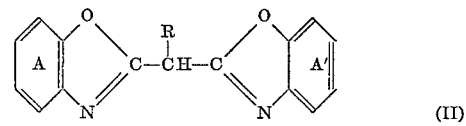

(II)

wherein R has the same meaning as in Formula I, and A and A' are unsubstituted or substituted as in Formula I, with about one equivalent weight of a lower alkanol ester of sulfuric acid or aryl sulfonic acid having one or two carbon atoms in the alkanol groups as alkylating agent, (b) reacting the resulting quaternized compound in aqueous medium at a pH of from 6 to 10 with about one equivalent of alkali metal hydroxide, carbonate or bicarbonate, (c) quaternization of the resulting tertiary amine compound with about one equivalent of a lower alkanol ester of sulfuric acid or aryl sulfonic acid having one or two carbon atoms in the alkanol groups as alkylating agent in an inert organic solvent at a temperature of from 100 to 120° C., and (d) recovering the resulting compound falling under formula I from the reaction mixture.

2. A process as described in claim 1 wherein R in the Formula I represents hydrogen.

3. A process as described in claim 1 wherein the aromatic solvent is selected from the group containing chlorobenzene, toluene and xylene.

4. The process of claim 1 wherein said colorless anion is an anion of methylsulfate, ethylsulfate, p-toluene sulfonic acid, p-chlorobenzene sulfonic acid or benzene sulfonic acid.

5. The process of claim 1 wherein in steps a and c, said alkylating agent is dimethylsulfate, diethylsulfate, p-toluene sulfonic acid methyl or ethyl ester, p-chlorobenzene sulfonic acid methyl ester or benzene sulfonic acid methyl ester.

6. A process for the production of a compound of the Formula I

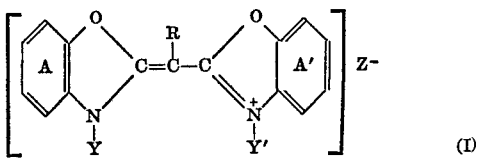

wherein each of benzene nucleus A and A' is unsubstituted or substituted by alkyl having 1 or 2 carbon or alkoxy having 1 or 2 carbon atoms, each of Y and Y' represents a methyl or ethyl group, R represents hydrogen or an alkyl group having 1 to 4 carbon atoms or a phenyl group, and $Z^-$ represents an anion of methylsulfate, ethylsulfate, p-toluene sulfonic acid, p-chlorobenzene sulfonic acid or benzene sulfonic acid, which process comprises (a) a monoalkylating process in an aromatic solvent selected from the group containing chlorobenzene, toluene or xylene at a temperature of from 100 to 120° C. of a bis-arenoazolyl methylene compound of the Formula II

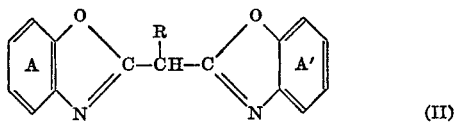

wherein R has the same meaning as in Formula I, and A and A' are unsubstituted or substituted as in Formula I, with about one equivalent weight of dimethylsulfate, diethylsulfate, p-toluene sulfonic acid methyl or ethyl ester, p-chlorobenzene sulfonic acid methyl ester or benzene, sulfonic acid methyl ester as alkylating agent, (b) reacting the resulting quaternized compound in aqueous medium at a pH of from 6 to 10 with about one equivalent of alkali metal hydroxide, carbonate or bicarbonate, (c) quaternization of the resulting tertiary amine compound with about one equivalent weight of dimethylsulfate, diethylsulfate, p-toluene sulfonic acid methyl or ethyl ester, p-chlorobenzene sulfonic acid methyl ester or benzene sulfonic acid methyl ester as alkylating agent in an organic solvent at a temperature of from 100 to 120° C., and (d) recovering the resulting compound falling under Formula I from the reaction mixture.

References Cited

UNITED STATES PATENTS

| | | | |
|---|---|---|---|
| 2,323,503 | 7/1943 | Wilson | 260—307 D |
| 2,541,400 | 2/1951 | Brooker et al. | 260—240.7 |
| 2,649,385 | 8/1953 | Kendall et al. | 260—240.7 X |

FOREIGN PATENTS

| | | | |
|---|---|---|---|
| 632,641 | 11/1949 | Great Britain | 260—240.1 |
| 1,559,863 | 2/1969 | France | 260—240.7 |

JOHN D. RANDOLPH, Primary Eaxminer

U.S. Cl. X.R.

106—176; 117—33.5 T; 252—302.2 W; 260—785, 88.7 B, 307 D, 609 R; 424—272

UNITED STATES PATENT OFFICE
CERTIFICATE OF CORRECTION

Patent No. 3,729,467         Dated April 24, 1973

Inventor(s) Reinhard Zweidler et al

It is certified that error appears in the above-identified patent and that said Letters Patent are hereby corrected as shown below:

Column 8, line 35, change "arenoaxolyl" to --- arenoazolyl ---.

Signed and sealed this 23rd day of July 1974.

(SEAL)
Attest:

McCOY M. GIBSON, JR.
Attesting Officer

C. MARSHALL DANN
Commissioner of Patents